US008301992B2

(12) United States Patent
Bybell et al.

(10) Patent No.: US 8,301,992 B2
(45) Date of Patent: Oct. 30, 2012

(54) SYSTEM AND APPARATUS FOR ERROR-CORRECTING REGISTER FILES

(75) Inventors: Anthony J. Bybell, Carrboro, NC (US); Michael B. Mitchell, Fuquay-Varina, NC (US); Jason M. Sullivan, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 12/537,890

(22) Filed: Aug. 7, 2009

(65) Prior Publication Data

US 2011/0035643 A1    Feb. 10, 2011

(51) Int. Cl.
    G06F 11/00      (2006.01)
    G08C 25/00      (2006.01)
    H03M 13/00      (2006.01)
    H04L 1/00       (2006.01)
(52) U.S. Cl. ........................................ 714/801; 714/799
(58) Field of Classification Search .................. None
    See application file for complete search history.

(56) References Cited

U.S. PATENT DOCUMENTS

| | | | |
|---|---|---|---|
| 6,701,484 B1 * | 3/2004 | Jordan et al. ................ | 714/801 |
| 6,941,489 B2 | 9/2005 | DeLano | |
| 7,447,941 B2 * | 11/2008 | Naffziger et al. ............... | 714/12 |
| 2007/0022273 A1 * | 1/2007 | Naffziger et al. ............. | 712/216 |
| 2010/0269022 A1 * | 10/2010 | Clark et al. ................... | 714/764 |

OTHER PUBLICATIONS

Smolens, J.C., et al.; "Efficient Resource Sharing in Concurrent Error Detecting Superscalar Microarchitectures"; Proceedings of the 37th International Symposium on Microarchitecture (MICRO-37'04); IEEE 2004.
Meixner, A. et al.; "Argus: Low-Cost, Comprehensive Error Detection in Simple Cores"; 40th IEEE/ACM International Symposium on Microarchitecture; 2007.
Pflanz, M. et al.; "On-line Techniques for Error Detection and Correction in Processor Register with Cross-Parity Check"; vol. 19, Issue 5, 8th IEEE International On-Line Testing Workshop, Jul. 8-10, 2002 (published Oct. 2003).
Yan, J., et al.; "Compiler-Guided Register Reliability Improvement Against Soft Errors"; EMSOFT'05, Sep. 19-22, 2005.
Blome, J. et al.; Cost-Efficient Soft Error Protection for Embedded Microprocessors; CASES'06, Oct. 23-25, 2006, Seoul, Korea.

* cited by examiner

*Primary Examiner* — Guerrier Merant
(74) *Attorney, Agent, or Firm* — Yudell Isidore Ng Russell PLLC

(57) ABSTRACT

A method, system and computer program product for enabling a register file to recover from detection of a parity error. A first register file and a second register file are associated with a parallel file structure. When the parity error is detected, the system determines whether the first register file or second register file is associated with the parity error. The register file determined to have the parity error is associated with an offending register and a non-offending register is associated with the "good" register file. Subsequent to the detection of the parity error, the system executes a repair sequence, whereby the register file associated with the offending register receives data from the register file associated with the non-offending register. The offending register file recovers from the parity error with or without the use of a parity interrupt.

28 Claims, 5 Drawing Sheets

SYSTEM AND APPARATUS FOR ERROR-CORRECTING REGISTER FILES

BACKGROUND

1. Technical Field

The present invention generally relates to microprocessors and in particular to register files within microprocessors.

2. Description of the Related Art

A microprocessor in an electronic system generally contains multiple functional units and registers utilized to process data. Register files, which are an array of processor registers, contain all general purpose registers of the microprocessor. Functional units such as arithmetic logic unit (ALU), adder units, floating point units execute operations to write data into pertinent register(s) in a register file. The operations of the register files are critical to the microprocessor and important to protect. Register files store data for extended periods of time. Additionally, data is frequently written to and read from register files. Register files are often susceptible to data corruption. Each read of the register file increases the possibilities for propagating corrupted data throughout the electronic system. Therefore, the register files of many microprocessors are protected via parity protection or error correcting codes.

Register files are often affected by parity error. 'Parity' is a form of error detection that uses a single bit to represent the odd or even quantities of '1's and '0's in the data. Parity usually consists of one parity bit for each eight bits of data. A computer system often calculates parity for critical reads and writes. On most systems, a parity error detection results in the computer system freezing entirely. The system must then be restarted. Existing approaches to protect register files have major limitations. Specifically, parity protection alone enables error detection with no correction of the data corruption. In the case of parity protection, when the error is detected, recovery is only possible by invoking a high-level operation at the operating system or application level. Often, the software is unable to recover from the "recovery operation", resulting in a complete reboot of the system and unnecessary system down time. Error correcting codes (ECC) enable detection and correction of errors. However, ECC require additional components. The additional components required by ECC utilize valuable microprocessor area and power, thereby reducing the performance of the microprocessor.

BRIEF SUMMARY

Disclosed are a method, a system and a computer program product for enabling a register file to recover from detection of a parity error. A first register file and a second register file are associated with a parallel file structure. When the parity error is detected, the system determines whether the first register file or second register file is associated with the parity error. The register file determined to have the parity error is associated with an offending, or "bad" register, and a non-offending, or "good" register is associated with the register file that does not have the parity error. Subsequent to the detection of the parity error, the system executes a repair sequence, whereby the register file associated with the offending register receives data from the register file associated with the non-offending register. In one embodiment the offending register and/or register file recovers from the parity error with the use of a parity interrupt. In another embodiment the offending register and/or register file recovers from the parity error without the use of a parity interrupt.

The above as well as additional objectives, features, and advantages of the present invention will become apparent in the following detailed written description.

BRIEF DESCRIPTION OF THE SEVERAL VIEWS OF THE DRAWINGS

The invention itself, as well as advantages thereof, will best be understood by reference to the following detailed description of an illustrative embodiment when read in conjunction with the accompanying drawings, wherein.

DETAILED DESCRIPTION

Figure 1:
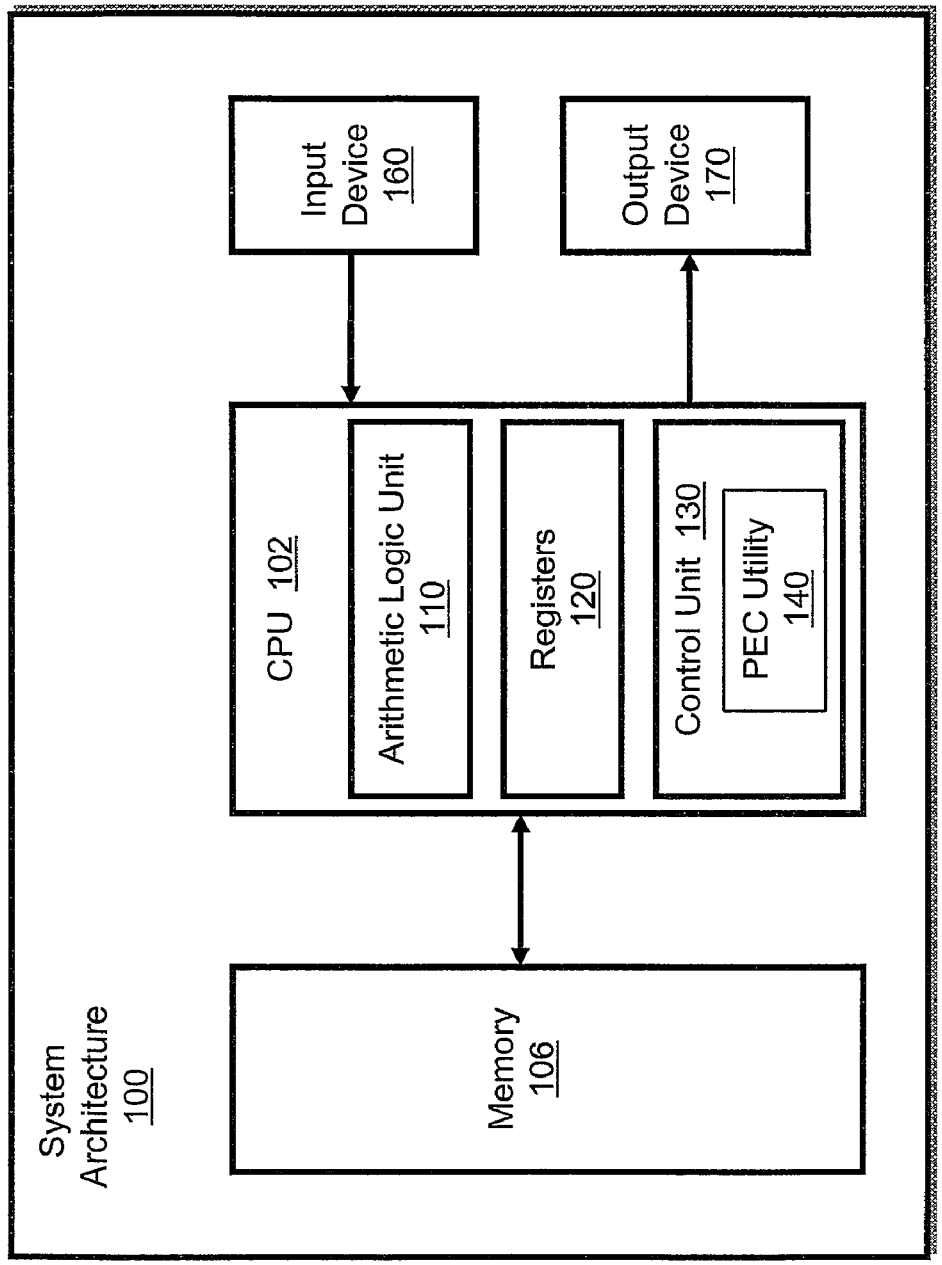
FIG. 1 provides a block diagram representation of a processor system architecture, according to one embodiment of the invention.

The illustrative embodiments provide a method, system and computer program product for enabling a register file to recover from detection of a parity error. A first register file and a second register file are associated with a parallel file structure. When the parity error is detected, the system determines whether the first register file or second register file is associated with the parity error. The register file determined to have the parity error is associated with an offending register and a non-offending register is associated with the "good" register file. Subsequent to the detection of the parity error, the system executes a repair sequence, whereby the register file associated with the offending register receives data from the register file associated with the non-offending register. In one embodiment the offending register/register file recovers from the parity error with the use of a parity interrupt. In another embodiment the offending register/register file recovers from the parity error without the use of a parity interrupt.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and beginning with FIG. 1, there is depicted a block diagram representation of an example system architecture, as utilized within one embodiment. System architecture 100 depicts the architecture of a digital system which may be a computer, a portable device, such as a personal digital assistant (PDA), a smart phone, and/or other types of electronic devices that may generally be considered processing devices. As illustrated, system architecture 100 comprises at least one processor or central processing unit (CPU) 102 communicating with memory 106, input device 160, and output device 170. Within CPU 102 are arithmetic logic unit 110, registers 120, and control unit 130.

In addition to the above described hardware components of system architecture 100, various features of the invention are completed/supported via software (or firmware) code or logic provided by parity error correction (PEC) utility 140, which executes on CPU 102 to provide parity error correction logic. For simplicity, PEC utility 140 is illustrated and described as a stand alone or separate software/firmware component, which provides specific functions, as described below. In one embodiment, PEC utility 140 is positioned within control unit 130. PEC utility 140 may also be located within memory 106 and/or another area of system architecture 100.

Certain functions supported and/or implemented by PEC utility 140 generate processing logic executed by processor and/or device hardware to complete the implementation of that function. For simplicity of the description, the collective body of code that enables these various features is referred to herein as PEC utility 140. Among the software code/instructions/logic provided by PEC utility 140, and which are specific to the invention, are: (a) code/logic for detecting the parity error associated with at least one register file of a first register file and a second register file that are associated with a parallel file structure; (b) code/logic for determining which one of the first register file and the second register file contains an offending register and which one contains a non-offending register having data corresponding to the data within the offending register; and (c) code/logic for executing a repair sequence when the parity error is detected and the non-offending register is determined, wherein the register file associated with the non-offending register transmits data to the register file associated with the offending register. According to the illustrative embodiment, when CPU 102 executes PEC utility 140, CPU 102 initiates a series of functional processes that enable the above functional features as well as additional features/functionality. These features/functionality are described in greater detail below within the description of FIGS. 2-5.

Those of ordinary skill in the art will appreciate that the hardware components and basic configuration depicted in FIG. 1 may vary. The illustrative components within system architecture 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The system architecture depicted in FIG. 1 may be, for example, the system architecture of an IBM eServer pSeries system, a product of International Business Machines Corporation in Armonk, N.Y., running the Advanced Interactive Executive (AIX) operating system or LINUX operating system.

Figure 2:
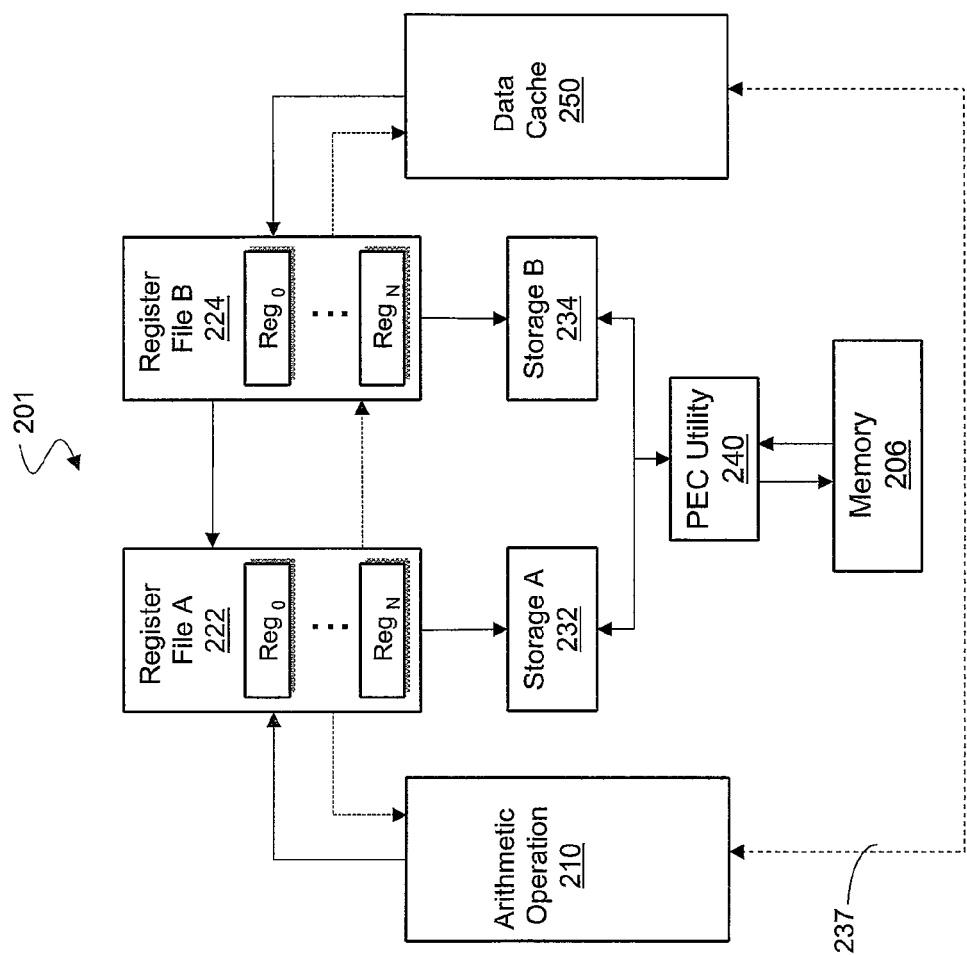
FIG. 2 is a schematic diagram illustrating operations for correcting parity error in the parallel register file structure, in accordance with one embodiment of the invention.

With reference now to FIG. 2, there is depicted a parallel register file structure by which operations for correcting parity error are provided, according to one embodiment. Parallel register file structure 201 includes a first register file, register file A 222 and a second register file, register file B 244, which registers communicate with arithmetic operation 210 and data cache 250. Redundant write data 237 is provided to register file A 222 and register file B 244 via arithmetic operation 210 and data cache 250. Register file A 222 and register file B 224 include an array of processor registers (for example $reg_0$ to $reg_n$, where n is a finite integer). Register file A 222 communicates with storage A 232 and register file B 224 communicates with storage B 234. PEC utility 240 manages operations of parallel register file structure 201. Memory 206, within parallel register file structure 201, receives and transmits information to and from PEC utility 240.

In one embodiment, a parity error associated with the parallel register file structure 201 is detected. Prior to detection of parity error, register file A 222 and register file B 224 are instantiated. Arithmetic operation 210 communicates with register file A 222 for reads and data cache 250 communicates with register file B 224 for reads. Arithmetic operation 210 and data cache 250 communicate simultaneously with register file A 222 and register file B 224, providing redundant write data 237 for future repair operations. When a write operation occurs on register file A 222, a parity value (e.g. first parity value) associated with register file A 222 is calculated. The parity value of register file A 222 is stored within storage A 232 along with the register value of register file A 222. When a write operation occurs on register file B 224, a parity value associated with register file B 224 is calculated. The parity value (e.g. second parity value) of register file B 224 is stored within storage B 234 along with the register value of register file B 224. When a read operation is detected on register file B 224 a parity value, associated with register file B 224, is calculated. The subsequent read operation can occur on either register file A 222 or register file B 224, however, register file B 224 is selected for illustrative purposes. PEC utility 240 calculates the parity value associated with register file B 224. If the calculated parity does not match the parity stored within storage B 234, the system identifies that register file B 224 is associated with parity error. If the calculated parity matches the parity stored within storage B 234, no parity error is detected and execution of the read command continues.

In another embodiment, PEC utility 240 determines which one of register file A 222 and second register file B 224 contains an offending register and which one contains a non-offending register having data corresponding to the data within the offending register. When PEC utility 240 determines which register is associated with the parity error, one or more operations are executed to correct the parity error. An interrupt (exception) is raised, which vectors to a high-priority repair sequence, whereby the level of priority is with respect to interrupt levels. The register file which signaled (or is identified as signaling) the parity error is associated with the offending register. The register file associated with the offending register receives the data from the "good" register file, or register file associated with the non-offending register.

In one embodiment, a repair sequence is executed when the parity error is detected, whereby the offending register file (register file associated with the offending register) receives data from the non-offending register file (register file associated with the non-offending register). Unique interrupt vectors are executed per register file (for register file A 222 and register file B 224). In the following example register file A 222 and register file B 224 are general purpose registers; however, the following operations are adaptable to other register types. A parity error is detected, enabling a machine check interrupt to be issued. When the parity error is associated with arithmetic operation 210, a series of load-store operations are vectored to scrub the offending register file (register file A 222) and save the data from each register within register file B 224 to memory 206. The data of register file A 222 is then written from memory 206 to each respective register associated with register file A 222 and register file B 224. PEC utility 240 then issues a return from the machine check interrupt.

In another embodiment, the parity error is associated with register file B 224. Register file B 224 communicates with data cache 250. When the parity error is identified on register file B 224, a machine check interrupt is issued. A series of identity operations are executed on register file B 224. For example, a series of arithmetic operations are vectored to multiply each register associated with register file B 224 by an integer, such as 1. When the arithmetic operations for all registers associated with register file B 224 are complete, PEC utility 240 triggers a return from the machine check interrupt. PEC utility 240 enables a return to the operation where the parity error was detected, and the operation is re-executed.

In one embodiment, register file A 222 and register file B 224 are symmetric, whereby operation(s) are issued to either register file A 222 or register file B 224. When a parity error is identified, PEC utility 240 disables (blocks) communication to the register file associated with the offending register. When the offending register is associated with register file A 222, PEC utility 204 directs all instructions/operations to register file B 224. Likewise, when the offending register is associated with register file B 224, PEC utility 204 directs all instructions/operations to register file B 222. A series of identity operations are executed enabling each register within the offending register file (register file associated with the offending register) to be scrubbed. A return from the machine interrupt is enabled. PEC utility 240 also enables a return to the point of operation where the parity error was detected, and the operation is re-executed. All operation blocks (or previously disabled communication) are removed from the interrupt repair sequence when the last register within the register file is scrubbed.

In another embodiment, parity correction is established with any type of register file. Provided that a single operation or a series of operations (which equate to an identity operation) are available for a given register, the interrupt repair sequence is adaptable to any type of register file. For example, for a single instruction, multiple data (SIMD) vector unit, given register file A 222 and register file B 224 are vector registers, the offending vector register is ANDed or ORed with itself, permuted such that the original value of the non-offending register is written back to both register files before the return from the interrupt.

In one embodiment, the parity interrupt is avoided by utilizing a dedicated forwarding repair sequence. In the dedicated forwarding repair sequence, the data from the non-offending register file is forwarded to the offending register file. For example, register file A 222 is the register file associated with the offending register(s) (i.e. register file A 222 exhibits a parity error). PEC utility 240 disables transmissions of all read and/or write operations and/or instruction transmission lines (pipes) associated with the offending register file when the parity error is detected. Data is read and written (i.e. transferred) from register file B 224 (register file associated with the non-offending register(s)) to register file A 222 (register file associated with the offending register). PEC utility 240 removes the previously issued instruction blocks. Transmission of the read and/or write operations associated with register file A 222 (previously offending register file) are enabled and/or reinstated at the operation in which the parity error was identified.

In another embodiment, a repair sequence is executed as an interrupt repair sequence when the parity error is detected. When the interrupt repair sequence is associated with one or more non-symmetric register files, PEC utility 240 executes one or more unique interrupt vectors for one or more registers of the one or more non-symmetric register files. A single interrupt vector is executed when the interrupt repair sequence is associated with symmetric register files, such as register file A 222 and register file B 224.

Figure 3:
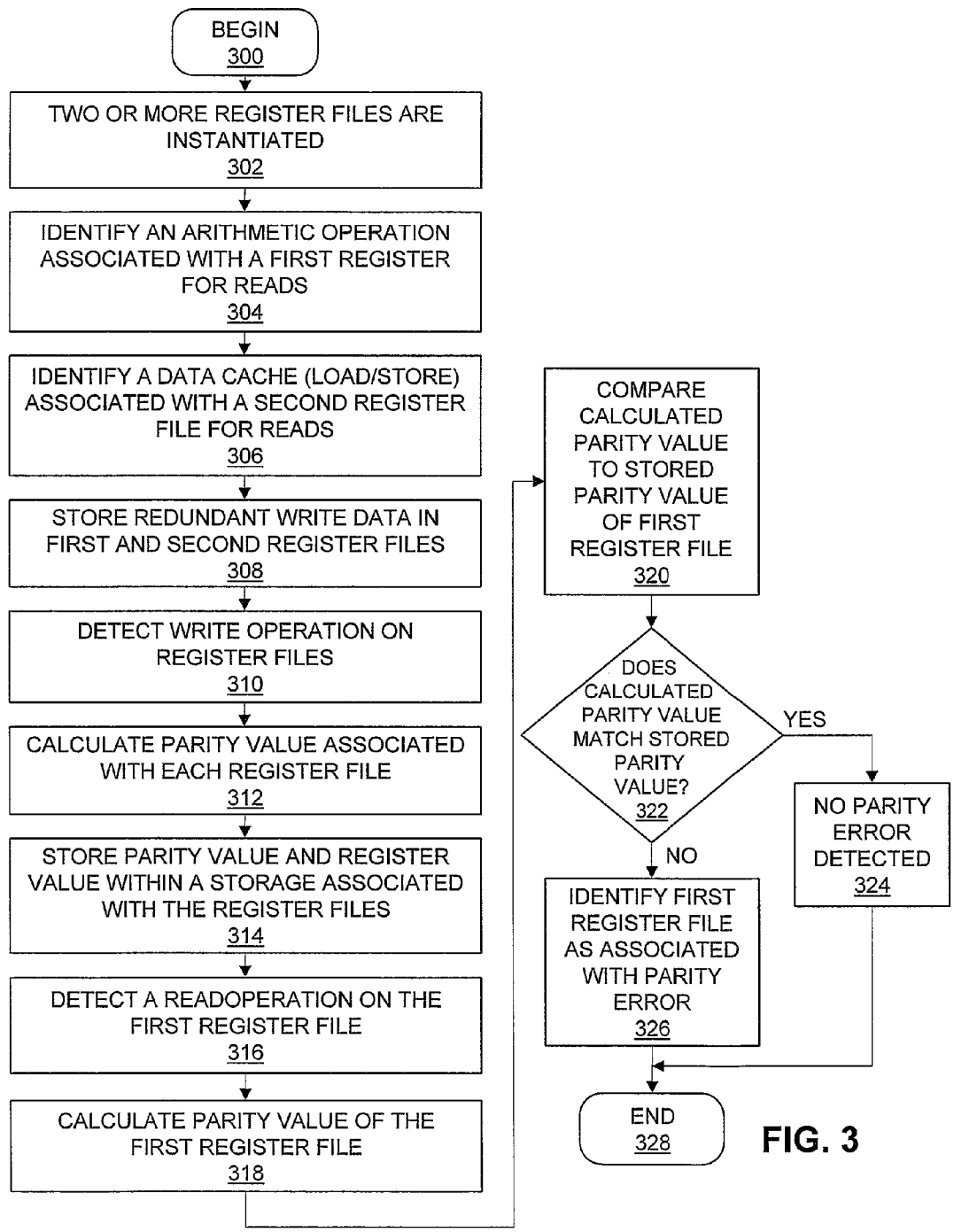
FIG. 3 is a logic flow chart for detecting parity error, according to one embodiment of the invention.
Figure 4:
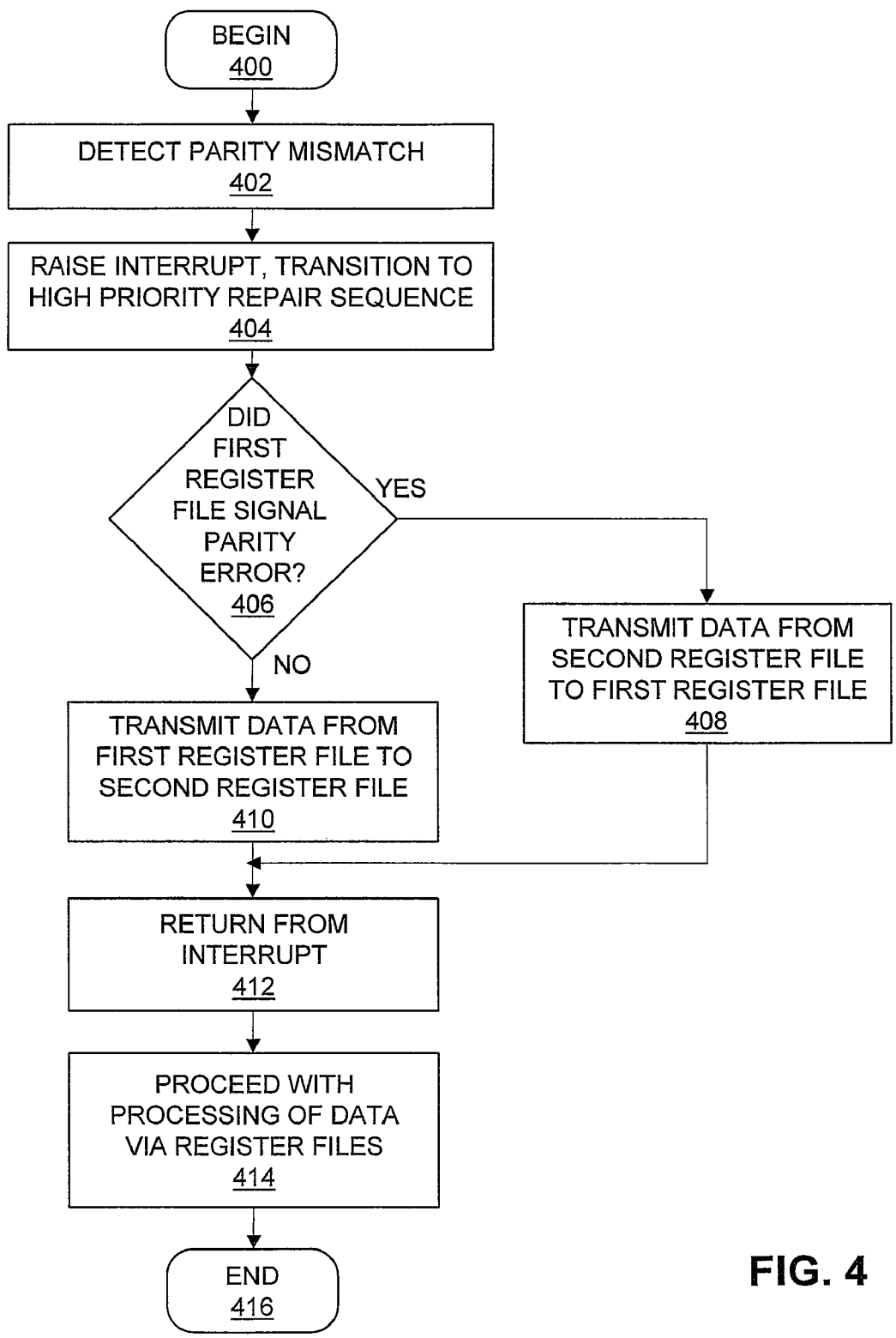
FIG. 4 is a logic flow chart for managing one or more register files when a parity error is detected, in accordance with one embodiment of the invention.
Figure 5:
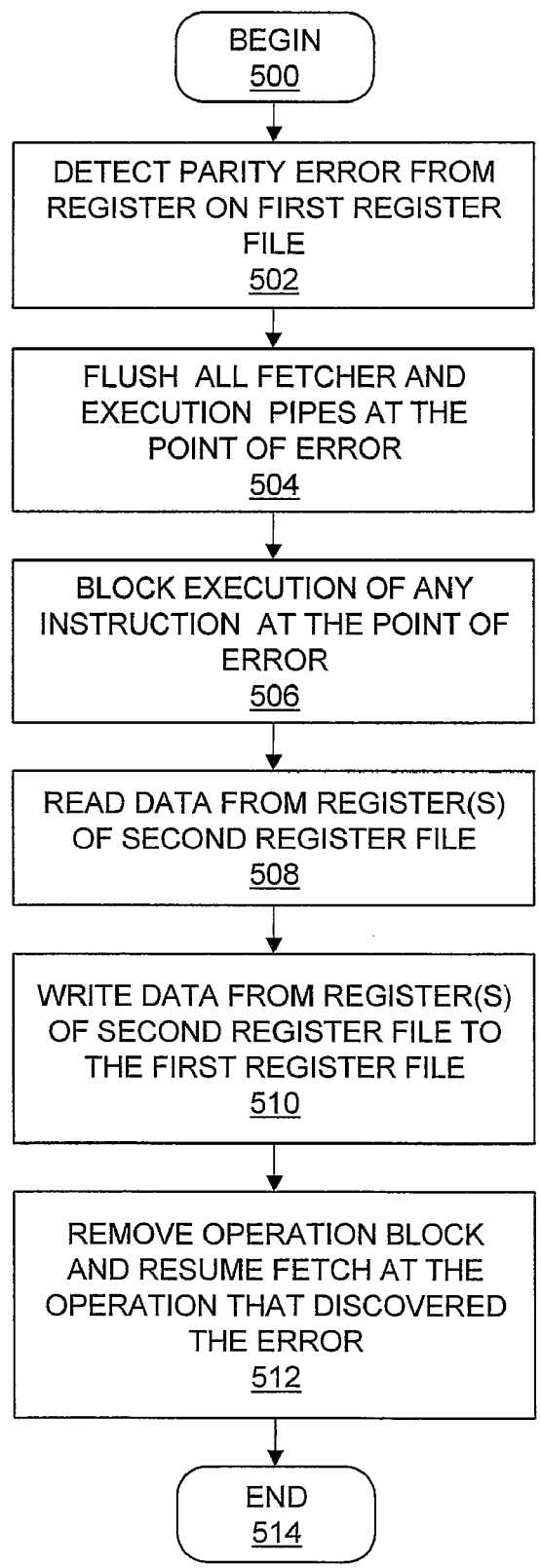
FIG. 5 is a logic flow chart for managing one or more register files without the use of an interrupt when a parity error is detected, according to one embodiment of the invention.

FIGS. 3-5 are flow charts illustrating various methods by which the above processes of the illustrative embodiments are completed. Although the methods illustrated in FIGS. 3-5 may be described with reference to components shown in FIGS. 1-2, it should be understood that this is merely for convenience and alternative components and/or configurations thereof can be employed when implementing the various methods. Key portions of the methods may be completed by PEC utility 140 executing on CPU 102 within system architecture 100 (FIG. 1) and controlling specific operations of system architecture 100, and the methods are thus described from the perspective of both PEC utility 140 and CPU 102.

The process of FIG. 3 illustrates the method by which parity error is detected. FIG. 3 begins at initiator block 300 and proceeds to block 302, at which two or more register files are instantiated. At block 304 an arithmetic operation for reads, associated with a first register, is identified. A data cache (load/store) operation for reads, associated with a second register file is identified at block 306. The arithmetic operation and data cache operation occur simultaneously with the first register file and the second register file, at block 308, thereby providing redundant write data for future repair operations. At block 310 a write operation on the register files is detected. The parity value associated with each register file is calculated at block 312. The parity values and register value associated with each register file is stored, at block 314, in a storage associated with the respective register file (e.g. storage A 232 stores a first stored parity value for register file A 222 and storage B 234 stores a second stored parity value for register file B 224). A read operation is detected on one of the first register file and second register file. For example, at block 316 the read is detected on the first register file. The parity value of the first register file is calculated at block 318. At block 320, the calculated parity value of the first register file is compared to the stored parity value of the first register file. A decision is made, at block 322, whether the calculated parity value matches the stored parity value. If the calculated parity value matches the stored parity value, the process continues to block 324. At block 324 no parity error is detected and continued execution is enabled for one or more read operations and write operations. If the calculated parity value of the first register file does not match the stored parity value of the first register file, the process continues to block 326. At block 326, PEC utility (140) identifies the first register file as a register file having parity error (i.e. links the register file associated with the read operation to the parity error). The process ends at block 328.

FIG. 4 depicts the process for managing one or more register files when a parity error is detected. The process of FIG. 4 begins at initiator block 400 and proceeds to block 402, at which a parity mismatch/error is detected. At block 404 an interrupt is raised, and the process transitions to a high priority repair sequence. A decision is made, at block 406, whether the first register file signaled the parity error. If the first register file signaled the parity error (caused by parity mismatch), the process continues to block 408. At block 408, PEC utility (140, FIG. 1) executes a sequence that enables data from the second register file to be transmitted to the first register file. The process continues to block 412. If the first register file did not signal the parity error, the process continues to block 410. At block 410 PEC utility (140) executes a sequence that enables the data from the first register file to be transmitted to the second register file. The system returns from interrupt at block 412. At block 414, PEC utility (140) enables continuation of processing of data via the register files. The process ends at block 416.

The process of FIG. 5 illustrates the method for managing one or more register files without the use of an interrupt when a parity error is detected. FIG. 5 begins at initiator block 500 and proceeds to block 502, at which parity error of a register associated with the first register file is detected. At block 504, all fetcher and execution pipes (instruction transmission lines) at the point of error are flushed (remove instruction/operation from lines). Execution of any operation is blocked at the point in which the parity error is detected at block 506. At block 508, data from registers of the second register file (non-offending register file) are read. The data from the registers of the second register file is written from the second register file (with non-offending register(s)) to the first register file (with offending register) at block 510. At block 512, the previously issued operation block is removed and fetch/execution of operations at the point of the parity error is resumed. The process ends at block 514.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer-implemented method for enabling recovery by a register file from detection of a parity error, said method comprising:

detecting the parity error associated with at least one register of a first register file and a second register that are associated with a parallel file structure, which comprises a first storage and a second storage respectively coupled to the first register file and the second register file for respectively storing a corresponding first parity value and a corresponding second parity value for each data within each register of the first register file and the second register file;

determining which one of the first register file and the second register file contains an offending register and which one contains a non-offending register having data corresponding to the data within the offending register; and executing a repair sequence in response to detecting the parity error and determining the non-offending register, wherein the register file associated with the non-offending register transmits data to the register file associated with the offending register.

2. The method of claim 1, further comprising:

instantiating the first register file and the second register file within the parallel file structure, whereby data written to one register file in the parallel file structure is also written to at least one other register file in the parallel file structure;

associating the first register file with the first storage;

associating the second register file with the second storage; and associating the first register file and the second register file with a memory that is utilized during the repair sequence to temporarily store data from the non-offending register before the data is copied to the offending register.

3. The method of claim 2, further comprising:

detecting a read operation on at least one of the first register file and the second register file;

in response to detecting a read operation on one of the first register file and second register file, calculating the parity value of a register file on which the read occurs, wherein the parity value calculated at a time of the read operation is a calculated parity value;

in response to the read operation being associated with the first register file, comparing the calculated parity value with the first stored parity value;

in response to the read operation being associated with the second register file, comparing the calculated parity value with the second stored parity value;

in response to one of the first parity value and second parity value not being equal to the calculated parity value, linking the register file associated with the read operation to the parity error; and enabling continued execution of one or more read operations and write operations when the calculated parity value is equal to a stored parity value of the register file associated with the read operation.

4. The method of claim 1, wherein executing a repair sequence when the parity error is detected further comprises:

executing the repair sequence as an interrupt repair sequence, wherein the interrupt repair sequence further comprises:

in response to the interrupt repair sequence being associated with one or more non-symmetric register files, executing one or more unique interrupt vectors for one or more registers of the one or more non-symmetric register files; and executing a single interrupt vector in response to the interrupt repair sequence being associated with symmetric register files.

5. The method of claim 1, wherein executing a repair sequence in response to detecting the parity error further comprises executing the repair sequence as a dedicated forwarding repair sequence, wherein the dedicated forwarding repair sequence comprises:

disabling transmission of one or more read and write instructions associated with the offending register file when the parity error is detected;

transferring data from the register file associated with the non-offending register to the register file associated with the offending register via a connected memory component; and enabling the transmission of the one or more read and write instructions associated with a previously offending register file following the transfer of data.

6. The method of claim 1, wherein executing the repair sequence further comprises:

transferring the data from the first register file to the second register file, when the non-offending register is associated with the first register file; and in response to the non-offending register being associated with the second register file, transferring the data from the second register file to the first register file via a connected memory component.

7. A computer program product comprising:

a computer-readable storage device; and program code on the computer-readable storage medium that when executed by a computer device having a processor with an arithmetic logic unit, a control unit, and one or more instantiated register files provides the functions of: detecting the parity error associated with at least one register of a first register file and a second register that are associated with a parallel file structure, which comprises a first storage and a second storage respectively coupled to the first register file and the second register file for respectively storing a corresponding first parity value and a corresponding second parity value for each data within each register of the first register file and the second register file; determining which one of the first register file and the second register file contains an offending register and which one contains a non-offending register having data corresponding to the data within the offending register; and executing a repair sequence in response to detecting the parity error is and determining the non-offending register, wherein the register file associated with the non-offending register transmits data to the register file associated with the offending register.

8. The computer program product of claim 7, further comprising program code for:

instantiating the first register file and the second register file within the parallel file structure, whereby data written to one register file in the parallel file structure is also written to at least one other register file in the parallel file structure;

associating the first register file with the first storage;

associating the second register file with the second storage;

associating the first register file and the second register file with a memory that is utilized during the repair sequence to temporarily store data from the non-offending register before the data is copied to the offending register;

detecting a write operation on at least one of the first register file and the second register file;

in response to detecting a write operation on the first register file and the second register file, calculating a respective first parity value and second parity value associated with the first register file and the second register file;

detecting a respective register value associated with the first register file and the second register file;

storing the first parity value and the register value associated with the first register file in the first storage, wherein the first parity value associated with the first register is a first stored parity value; and storing the second parity value and the register value associated with the second register file in the second storage, wherein the second parity value associated with the second register file is the second stored parity value.

9. The computer program product of claim 8, further comprising program code for:

detecting a read operation on at least one of the first register file and the second register file;

in response to detecting a read operation on one of the first register file and second register file, calculating the parity value of a register file on which the read occurs, wherein the parity value calculated at a time of the read operation is a calculated parity value;

in response to the read operation being associated with the first register file, comparing the calculated parity value with the first stored parity value;

in response to the read operation being associated with the second register file, comparing the calculated parity value with the second stored parity value;

in response to one of the first parity value and second parity value not being equal to the calculated parity value, linking the register file associated with the read operation to the parity error; and enabling continued execution of one or more read operations and write operations when the calculated parity value is equal to a stored parity value of the register file associated with the read operation.

10. The computer program product of claim 7, wherein executing a repair sequence in response to detecting the parity error further comprises program code for:

executing the repair sequence as an interrupt repair sequence, wherein the interrupt repair sequence further comprises:

in response to the interrupt repair sequence being associated with one or more non-symmetric register files, executing one or more unique interrupt vectors for one or more registers of the one or more non-symmetric register files; and executing a single interrupt vector when the interrupt repair sequence is associated with symmetric register files.

11. The computer program product of claim 8, wherein executing a repair sequence when the parity error is detected further comprises executing the repair sequence as a dedicated forwarding repair sequence, wherein the dedicated forwarding repair sequence further comprises program code for:

disabling transmission of one or more read and write instructions associated with the offending register file when the parity error is detected;

transferring data from the register file associated with the non-offending register to the register file associated with the offending register via a connected memory component; and enabling the transmission of the one or more read and write instructions associated with a previously offending register file following the transfer of data.

12. The computer program product of claim 7, further comprising program code for:

transferring the data from the first register file to the second register file, when the non-offending register is associated with the first register file; and in response to the non-offending register being associated with the second register file, transferring the data from the second register file to the first register file via a connected memory component.

13. A data processing system comprising:

a processor component having a first register file that is communicatively coupled to and communicates with an arithmetic operation component and a second register file that is communicatively coupled to and communicates with a data cache, wherein the first register file and the second register file are provided redundant write data via one or more of the arithmetic operation component and the data cache, and wherein each of the first register file and the second register file comprises an array of a finite integer number of processor registers;

a first storage coupled to the first register file and that receives data from the first register file for storage within the first storage, and a second storage coupled to the second register file and that receives data from the second register file for storage within the second storage, wherein the first register file communicates with the first storage and the second register file communicates with the second storage;

a memory that is communicatively coupled to each of the first storage and the second storage; and one or more logic of the processor component which logic comprises code that executes to enable recovery by at least one of the first register file and the second register file from detection of a parity error, said logic including code that enables the processor component to:

detect the parity error associated with at least one register file of a first register file and a second register file that are associated with a parallel file structure;

determine which one of the first register file and the second register file contains an offending register and which one contains a non-offending register having data corresponding to the data within the offending register; and execute a repair sequence when the parity error is detected and the non-offending register is determined, wherein the register file associated with the non-offending register transmits data to the register file associated with the offending register.

14. The data processing system of claim 13, further comprising logic that enables the processor component to:

instantiate the first register file and the second register file within the parallel file structure, whereby data written to one register file in the parallel file structure is also written to at least one other register file in the parallel file structure;

associate the first register file with a first storage;

associate the second register file with a second storage;

detect a write operation on at least one of the first register file and the second register file;

in response to detecting a write operation on the first register file and the second register file, calculate a respective first parity value and second parity value associated with the first register file and the second register file;

detect a respective register value associated with the first register file and the second register file;

store the first parity value and the register value associated with the first register file in the first storage, wherein the first parity value associated with the first register is a first stored parity value; and store the second parity value and the register value associated with the second register file in the second storage, wherein the second parity value associated with the second register file is the second stored parity value.

15. The data processing system of claim 14, further comprising logic that enables the processor component to:

detect a read operation on at least one of the first register file and the second register file;

in response to detecting a read operation on one of the first register file and second register file, calculating the parity value of a register file on which the read occurs, wherein the parity value calculated at a time of the read operation is a calculated parity value;

in response to the read operation being associated with the first register file, comparing the calculated parity value with the first stored parity value;

in response to the read operation being associated with the second register file, comparing the calculated parity value with the second stored parity value;

in response to one of the first parity value and second parity value not being equal to the calculated parity value, linking the register file associated with the read operation to the parity error; and enabling continued execution of one or more read operations and write operations when the calculated parity value is equal to a stored parity value of the register file associated with the read operation.

16. The data processing system of claim 13, wherein the logic that enables executing a repair sequence when the parity error is detected further comprises logic that enables the processor component to:

execute the repair sequence as an interrupt repair sequence, wherein the interrupt repair sequence further comprises:

in response to the interrupt repair sequence being associated with one or more non-symmetric register files, executing one or more unique interrupt vectors for one or more registers of the one or more non-symmetric register files; and execute a single interrupt vector in response to the interrupt repair sequence being associated with symmetric register files.

17. The data processing system of claim 13, wherein the logic that executes a repair sequence in response to detecting the parity error further comprises logic that causes the processor component to execute the repair sequence as a dedicated forwarding repair sequence, wherein the dedicated forwarding repair sequence further comprises logic that causes the processor component to:

disable transmission of one or more read and write instructions associated with the offending register file when the parity error is detected;

transfer data from the register file associated with the non-offending register to the register file associated with the offending register via a connected memory component; and enable the transmission of the one or more read and write instructions associated with a previously offending register file following the transfer of data.

18. The data processing system of claim 13, further comprising logic that causes the processor component to:

transfer the data from the first register file to the second register file, when the non-offending register is associated with the first register file; and in response to the non-offending register being associated with the second register file, transfer the data from the second register file to the first register file via a connected memory component.

19. The method of claim 1, further comprising:

detecting a write operation on at least one of the first register file and the second register file;

in response to detecting a write operation on the first register file and the second register file, calculating a respective first parity value and second parity value associated with the first register file and the second register file;

detecting a respective register value associated with the first register file and the second register file;

storing the first parity value and the register value associated with the first register file in the first storage, wherein the first parity value associated with the first register is a first stored parity value; and storing the second parity value and the register value associated with the second register file in the second storage, wherein the second parity value associated with the second register file is the second stored parity value.

20. The method of claim 1, wherein the parallel file structure comprises an arithmetic operation that communicates with the first register file for reads and a data cache that communicates with the second register file for reads, wherein during a write operation, the arithmetic operation and the data cache communicate simultaneously with first register file and second register file in order to provide redundant write data for future repair operations.

21. The method of claim 1, wherein executing the repair sequence comprises raising an interrupt, wherein the interrupt vectors to a high-priority repair sequence, and wherein a level of priority is with respect to interrupt levels.

22. The method of claim 1, wherein unique interrupt vectors are executed by each of the first register file and the second register file, and executing a repair sequence comprises:

initiating a machine check interrupt;

in response to the parity error being associated with the arithmetic operation:

vectoring a series of load-store operations to scrub the first register file, which is the offending register file; and saving data from each register within the second register file to memory;

writing the data from memory to each respective register associated with both the first register file and the second register file; and issuing a return from the machine check interrupt.

23. The method of claim 1, further comprising:

in response to the parity error being identified as occurring on the second register file:

issuing a machine check interrupt;

executing a series of identity operations, wherein executing the series of identify operations comprise vectoring a series of arithmetic operations to multiply each register associated with the second register file by an integer, 1; and in response to completion of the arithmetic operations for all registers associated with the second register file, triggering a return from the machine check interrupt; enabling a return to an operation where the parity error was detected; and re-executing the operation.

24. The method of claim 1, wherein executing the repair sequence comprises:
- disabling/blocking communication to the offending register file;
- directing all instructions and operations to the non-offending register file;
- executing a series of identity operations that enables each register within the offending register file to be scrubbed;
- enabling a return from the machine interrupt to a point of operation where the parity error was detected, and re-executing an operation;
- removing all operation blocks from the interrupt repair sequence in response to completion of scrubbing of a last offending register within the offending register file.

25. The method of claim 1, wherein, responsive to the first register file and the second register file being vector registers, for a single instruction, multiple data (SIMD) vector unit, perfuming one of an ANDing and an ORing of the offending vector register with itself, and perform a permutation to write an original value of the non-offending register back to both the first register file and the second register file before providing a return from the interrupt.

26. The method of claim 1, wherein executing the repair sequence comprises:
- disabling at least one of: (a) transmission of all read and write operations and (b) instruction transmission lines associated with the offending register file; and
- in response to completion of a write of data to the offending register file, removing previously issued instruction blocks, re-instating transmission of the read and/or write operations associated with the previously offending register file register file.

27. The method of claim 1, wherein: executing the repair sequence comprises executing the repair sequence as an interrupt repair sequence when the parity error is detected; and the method further comprises:
- determining whether the interrupt repair sequence is associated with one or more non-symmetric register files; and
- in response to determining that the interrupt repair sequence is associated with one or more non-symmetric register files, executing one or more unique interrupt vectors for one or more registers of the one or more non-symmetric register files; and
- in response to the interrupt repair sequence being associated with symmetric register files, executing a single interrupt vector.

28. The method of claim 1, wherein executing the repair sequence comprises:
- in response to identifying at which register the parity error is detected, flushing all fetcher and execution pipes at a point of error to remove all instructions and operations from the instruction transmission lines;
- blocking execution of any operation at a point in which the parity error is detected; and
- in response to completion of the passing of data to the offending register file, removing a previously-issued operation block and resuming fetching and execution of operations at the point of the parity error.

* * * * *